Jan. 12, 1926.  1,569,796
E. L. WATSON
ELECTRIC SOLDERING TOOL
Filed July 25, 1924
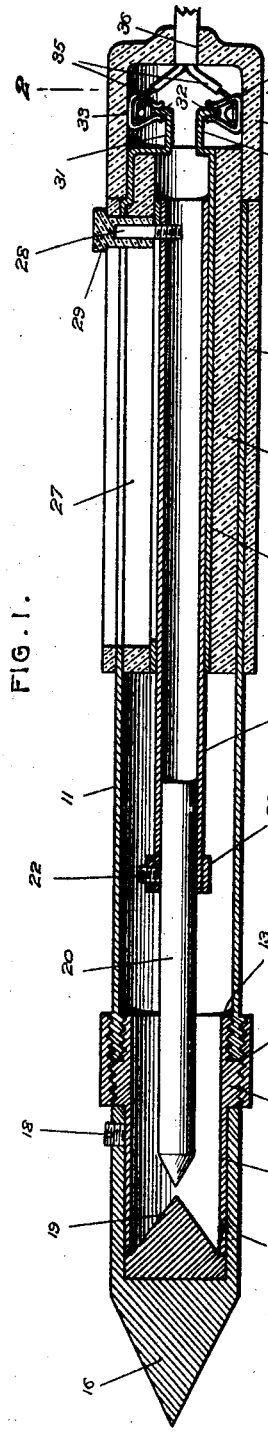
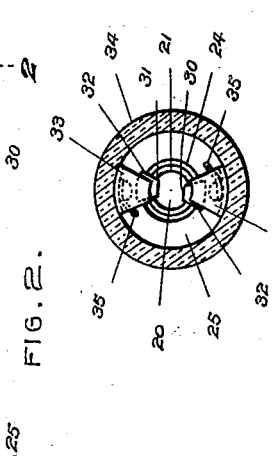
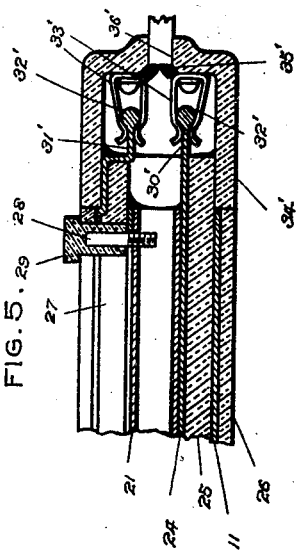
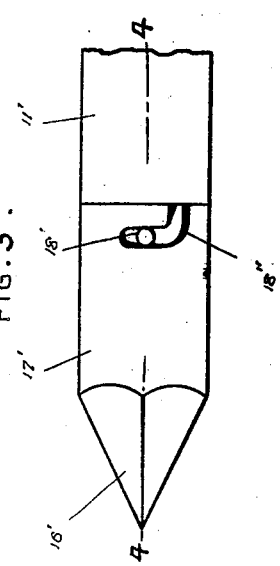
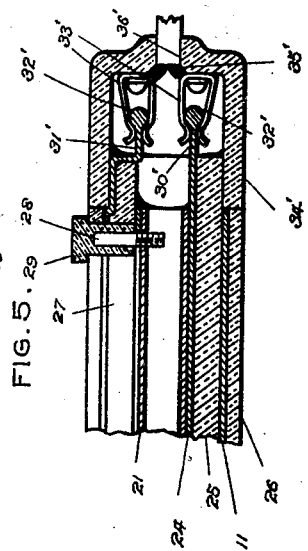
Inventor:
E. L. WATSON,
By Monroe E. Miller
Attorney.

Patented Jan. 12, 1926.

1,569,796

UNITED STATES PATENT OFFICE.

EDWARD L. WATSON, OF BODE, IOWA.

ELECTRIC SOLDERING TOOL.

Application filed July 25, 1924. Serial No. 728,151.

*To all whom it may concern:*

Be it known that I, EDWARD L. WATSON, a citizen of United States, residing at Bode, in the county of Humboldt and State of Iowa, have invented certain new and useful Improvements in Electric Soldering Tools, of which the following is a specification, reference being had therein to the accompanying drawing.

The present invention relates to soldering tools, and aims to provide a novel and improved electric soldering tool using an electric arc as the source of heat for the point or head of the tool.

Another object of the invention is the provision of a point or head detachably connected to the body by a novel connection, in order that points or heads of different sizes and shapes can be used interchangeably.

A further object of the invention is the provision of novel means for mounting the electrodes therein and for connecting them in an electrical circuit.

It is also an object of the invention to provide such a tool comprising a novel construction and assemblage of the component elements, to enhance the utility and efficiency of the device.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawing, wherein—

Figure 1 is a longitudinal median section of the tool, portions being shown in elevation.

Fig. 2 is a cross section on the line 2—2 of Fig. 1.

Fig. 3 is a side elevation of a modified construction showing only that end portion of the tool including the point or head.

Fig. 4 is a section on the line 4—4 of Fig. 3.

Fig. 5 is a longitudinal section of the rear end portion of a further modified construction.

The body 11 of the tool comprises a tube of steel or other suitable material, and a shorter tube or neck 12 of brass or other suitable material projecting beyond the forward end of the body 11, the rear end of the neck 12 being screw-threaded into the tubular body 11. The neck 12 has a collar 14 abutting the end of the body 11, and a sleeve 15 of suitable metal is screw-threaded on the collar 14 and the forward end portion of the body 11. The screw threads between the sleeve 15 and the collar 14 and body 11 are tapered forwardly, so that when the sleeve 15 is screwed rearwardly thereon, the sleeve will bind on the collar 14 and body 11 to provide a tight joint which will withstand changes in temperature. This is especially desirable when the body 11 and neck 12 are of different metals, such as steel and brass, having different coefficients of expansion.

The point or head 16, which may be of any suitable size and shape, has a rearwardly extending sleeve 17 to slip on the neck 12 for detachably connecting the body and point or head, and the sleeve 17 carries one or more set screws 18 to engage the neck 12 and secure the sleeve thereon. The point or head is of copper or other suitable material, and points or heads of different sizes and shapes can be used interchangeably, providing each of them has a sleeve 17 adapted to telescope over the neck 12.

The electrodes are disposed within the neck 12 to provide an arc adjacent to the point or head. One electrode comprises a cone 19 of carbon seated against the point or head 16 within the sleeve 17, and the other electrode comprises a carbon pencil 20 which is adjustable longitudinally within the body or tube 11 so that the pencil 20 can be fed or moved forwardly as it is consumed by the arc.

In order to support the pencil or electrode 20, there is provided a tube 21 disposed concentrically within the body 11 and slidable along the axis of said body, and the pencil 20 extends into the tube 21. The pencil 20 is secured to the tube 21 by a set screw 22 carried by the forward end portion of the tube 21, a band or collar 23 being preferably provided on the tube 21 to provide sufficient stock for the engagement of the set screw, especially when the tube 21 is of thin metal. The tube 21 slides within a guide tube 24 which is fitted within the tubular insulator 25 of fibre or other suitable insulating material, said insulator being fitted within the rear end portion of the tubular body 11. A sleeve 26 of fibre or insulating material of any suitable kind is fitted on the body 11. The tube 24, insulator 25, body 11 and sleeve 26 have the longitudinal slot 27, and a pin 28 secured to the tube 21 is movable in said slot. A button 29 of insulating material is fitted over the pin to work in the slot, and projects from the slot for the engagement of the thumb and fingers so that the tube 21 and pencil 20 can be slid longitudinally conveniently within the body.

The forward ends of the tube 24, insulator 25 and sleeve 26 are spaced from the forward end of the body 11, and the rear end of the sleeve 26 is preferably flush with the rear end of the body 11, while the insulator 25 projects from the rear end of the body.

In order to make the electrical connections for bringing the electrodes in an electric circuit, the rear ends of the body 11 and tube 24 have the tongues 31 and 30, respectively, offset inwardly toward one another, and projecting rearwardly from the rear end of the insulator 25. Said tongues have the portions 32 bent at an angle away from one another to be engaged by clips 33 which are secured to the rim of a cap 34 of insulating material which is adapted to be slipped on the rear projecting end portion of the insulator 25. Electrical conductors or wires 35 are connected to the clips 33 and pass through an aperture 36 at the center of the cap. When the cap 34 is turned relatively to the body 11 to remove the clips 33 from the portions 32, the cap can be readily slipped off and on the insulator 25, and when the cap is positioned on the insulator and then turned to move the clips 33 into engagement with the portions 32, the electrical connections are not only made, but the cap 34 is also prevented from being pulled from the body, so that it is necessary to turn the cap and body relatively to one another before they can be separated. One conductor 35 is connected by way of the tongue 31, body 11, neck 12 and point 16 with the electrode or carbon cone 19, while the other conductor is connected by way of the tongue 30, tube 24 and tube 21 with the pencil or electrode 20. The sleeve 26 provides a convenient handle for manipulating the tool, without danger of the operator receiving an electrical shock.

In using the tool, the pencil 20 is adjusted forwardly to regulate the gap between the electrodes, so that the heat generated by the arc will heat the point or head 16. Different points or heads can be used interchangeably on the body, and the pencil 20 can also be adjusted in the tube 21, to enable practically the entire pencil to be consumed. Thus, when the point or head 16 is removed, the tube 21 can be slid forwardly so that the forward end thereof projects from the neck 12, giving access to the set screw 22, which enables the pencil 20 to be loosened and slid forwardly in the tube 21. The tube 21 and pencil 20 are then slid rearwardly, and after the point or head is positioned on the neck 12, the pencil can then be adjusted forwardly adjacent to the electrode 19.

Figs. 3 and 4 show a tubular body 11' which has its forward end portion 12' of reduced diameter to provide the neck for receiving the sleeve 17' of the point or head 16'. The neck 12' is shown as having studs 18' for the engagement of bayonet slots 18'' with which the sleeve 17' is provided. This manner of connection can be used in lieu of that shown in Fig. 1.

Fig. 5 shows a modified form of electrical connection. Thus, the tongues 30' and 31' of the tube 24 and body 11 have knobs 32' engaged within the clips 33' which are secured within the cap 34', the conductors or wires 35' being secured to said clips and passing through the aperture 36' in the cap. The tongues 30' and 31' and clips 33' are adapted to slip into engagement by the longitudinal movement of the cap 34' on the insulator 25, and the clips engaging over the knobs 32' will hold the cap in place frictionally. This provides a slip connection instead of a rotary connection as the device shown in Figs. 1 and 2.

Having thus described the invention, what is claimed as new is:—

1. A tool of the character described comprising a tubular body, a tubular neck of different material screw-threaded into one end portion of the body and having a collar abutting said end portion of the body, a sleeve screw-threaded on said collar and end portion of the body, a head having a sleeve fitted removably on said neck, an electrode adjacent to said head within the last named sleeve, and an electrode mounted adjustably within the body and projecting into said neck to form an arc with the first named electrode.

2. A tool of the character described comprising a tubular body, a head connected to the forward end thereof, an electrode associated with said head, a tubular insulator within said body and projecting from the rear end thereof, a guide tube within said insulator, a tube slidable within the guide tube, a pencil electrode within the second-named tube and cooperable with the aforesaid electrode, the body and tubes being of conducting material, the body and guide tube having portions projecting from the rear end of the insulator, a cap to fit on the rear end portion of the insulator, and clips carried by said cap for the connection of electrical conductors, said clips and portions being interchangeable for making electrical connections and holding the cap on the insulator.

3. A tool of the character described comprising a tubular body, a head connected to the forward end thereof, an electrode associated with said head, a tubular insulator within the body and projecting from the rear end thereof, a guide tube within said insulator, a slidable tube within the guide tube, said body and tubes being of conducting material, a pencil electrode within the slidable tube and cooperable with the aforesaid electrode, a sleeve of insulating material on the body, said guide tube, insulator, body and sleeve having a longitudinal slot, a button carried by the slidable tube and working in said slot, the rear end of the body and guide tube having tongues projecting from the rear end of the insulator, a cap fitting removably on the rear end portion of the insulator and abutting said sleeve, and clips secured within said cap for the connection of electrical conductors said clips and tongues being interengageable for making electrical connections and holding the cap on the insulator.

In testimony whereof I hereunto affix my signature.

EDWARD L. WATSON.